Figure 1:
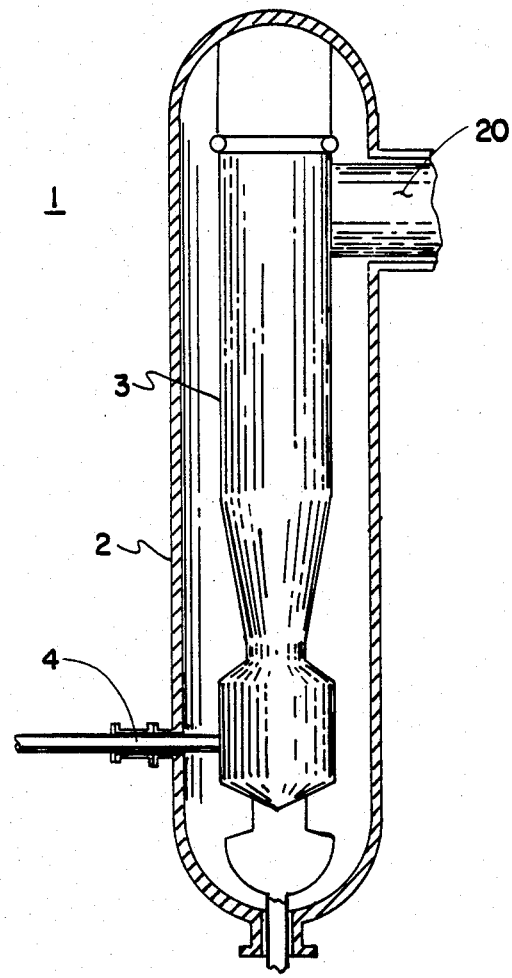

United States Patent [19]

Covell et al.

[11] Patent Number: 4,581,041

[45] Date of Patent: Apr. 8, 1986

[54] MOUNT FOR THE FUEL NOZZLE OF A GASIFIER

[75] Inventors: Russell B. Covell, Granby; Edward Rebula, Bloomfield, both of Conn.

[73] Assignee: Combustion Engineering, Inc., Windsor, Conn.

[21] Appl. No.: 690,275

[22] Filed: Jan. 10, 1985

[51] Int. Cl.[4] .............................................. C10J 3/48
[52] U.S. Cl. .......................................... 48/76; 48/67; 48/86 R; 48/87; 110/229
[58] Field of Search ....................... 48/67, 86 R, 87, 77, 48/76; 422/213, 219; 406/86; 239/397.5; 110/261, 264, 229; 285/133 R, 138, 226, 299

[56] References Cited

U.S. PATENT DOCUMENTS 3,068,026 12/1962 McKamey ............................ 285/47
4,305,732 12/1981 Koenig et al. ........................... 48/67

FOREIGN PATENT DOCUMENTS 2509230 9/1976 Fed. Rep. of Germany ...... 285/226
596911 1/1948 United Kingdom ............. 239/397.5

Primary Examiner—Jay H. Woo
Assistant Examiner—J. E. Cabaniss
Attorney, Agent, or Firm—Arthur L. Wade; Troxell K. Snyder

[57] ABSTRACT

An assembly for supplying gas-conveyed solid fuel to the interior of a double wall gasification vessel includes a conduit (4) for conducting the fuel-gas mixture across the annular region (16) formed between the inner (3) and outer (2) vessel walls. A flexible coupling (11) is provided at one end of the conduit proximate the penetration of the fuel-gas stream across the vessel pressure boundary. An expansion joint (14), disposed about the conduit (4) and sealed to the inner vessel wall (3) conducts secondary gas into the inner vessel across the annular region (16) and prevents leakage of corrosive gases from the inner vessel interior.

4 Claims, 2 Drawing Figures

MOUNT FOR THE FUEL NOZZLE OF A GASIFIER

TECHNICAL FIELD

The present invention relates to mounting a conduit through which an air-entrained solid fuel is delivered into the interior of a pressurized double-wall containment vessel. More particularly, the invention relates to the mount for the air-entrained solid fuel conduit of a pressurized double-wall containment vessel wherein a high temperature process is generated.

BACKGROUND ART

Coal gasification burners offer a viable alternative to flue gas scrubbing for the utilization of high sulfur coals in a commercial utility steam generator. Coal gasifiers, in conjunction with combined cycle power generation, provide a significant decrease in the plant heat rate, resulting in cost savings in the production of electricity. One of the most attractive coal gasifier designs is an entrained upward gas flow unit firing pulverized coal to produce a low Btu and medium Btu product gas. Gasification at high pressure (greater than 14.7 psia) offers some additional advantage in reducing plant heat rate.

Operation of high temperature, high pressure chemical reaction processes has long presented a vexing problem in the chemical and heat transfer arts. Reaction vessels may be designed to withstand either high temperatures or high pressures, but not both simultaneously. One potential solution to this problem is the use of a double-wall containment vessel. A double-wall containment vessel is, in practice, two vessels, one wholly disposed within the other, and each designed to cooperatively contain a high temperature, high pressure reaction.

We will presently consider a double-wall containment vessel which includes an inner vessel, constructed with water-cooled membrane walls, for withstanding a high temperature reaction process. These membrane walls, constructed by longitudinally welding a plurality of substantially parallel tubes together, is, itself, unable to withstand a high pressure differential from one side to the other. Pressure differentials in excess of fifty inches of water (12.4 kPa) are generally considered to be the maximum accommodated by such membrane walls.

The outer vessel of a double-wall containment enclosure is designed to accommodate the high pressure of the process. The outer vessel is typically a solid vessel, possibly constructed of a high strength alloy and having a thickness of several inches. During start-up, load changes, and shut-down periods, a difference in temperature between the two suspended vessels cause their thermal expansions and contractions to differ significantly. For example, during start-up, the heat generated in the inner vessel will cause the temperature of the inner vessel walls to differ from the temperature of the outer vessel. The thermal expansion of the inner vessel will be manifested by a downward elongation expansion of several inches. Over a period of time, the temperature of the outer vessel will approach that of the inner vessel, accompanied by an elongation which will closely match the elongation of the inner vessel. These changes which are relative expansions longitudinally between the two vessels cause severe stress in the conduits for fuel and air as they penetrate the walls of the two vessels.

One high pressure, high temperature process is the pressurized conversion of solid coal particles into combustible fuel gas. A high pressure gasification process may require pressures in excess of five atmospheres, and temperatures in the hottest portions of the reactor up to 3000° F. or higher. The introduction of abrasive coal into a double-wall reaction vessel has proved to be a problem due to the nature of the material being fed, and the interaction between the inner and outer vessel due to differential thermal expansion. Due to the nature of the chemical process, the fuel gas in the reaction vessel is hot and particle laden. In order to protect the outer vessel from this hot particle-laden gas, any penetrations through the wall of the inner vessel must be sealed.

The inner, heat resistant vessel, typically experiences a significant variation in dimension as it goes from an inactive state with temperatures corresponding to the surrounding environment, to the operating state, with coolant temperatures in the range of 600° to 800° F., and interior wall metal temperatures even higher. The outer vessel, possibly constructed of different material and well protected from the high temperature reaction by the inner wall, experiences a much slower rate of thermal expansion. The differential expansion may be as great as one foot (0.3 m) or more in a direction colinear with the longitudinal dimension of the inner and outer vessels. Such expansion must be accommodated by any feed line passing through the outer vessel wall and connecting to or passing into the inner vessel wall. One method of the prior art calls for the use of an expansion loop, disposed in the annular region formed between the inner and outer vessel walls, the expansion loop allowing the end points of a feed conduit to move each relative to the other without causing unacceptable stress in the looped conduit.

The feed of abrasive coal into the interior of the inner vessel has proved troublesome in that the expansion loops of the prior art are not able to withstand the high abrasion of the coal particles which occurs in the elbow sections of the looped conduit. Feeding coal is best accomplished through the use of a straight, rigid pipe which does not contain any significant bends. Such a straight, rigid pipe secured to the outer vessel wall and penetrating the inner vessel wall and sealed thereto has proved to be unsatisfactory due to the flexure of the feed conduit possible in the small annular region between the inner and outer walls.

DISCLOSURE OF THE INVENTION

The present invention contemplates support and movement of the straight and rigid primary air/fuel conduit connected to the supply of fuel and air through a flexible coupling within the pressure boundary of the outside containment vessel of a pressurized gasifier which compensates for the differential expansion between the outside vessel and inner reaction vessel. The flexible connection between the source of the fuel and primary air and the rigid conduit at a remote location from the inner vessel compensates for the differential expansion between the two vessels.

The invention further contemplates an expansion joint for the secondary air conduit between the inner and outer vessels to compensate for the differential thermal expansion between the two vessels.

Other objects, advantages and features of this invention will become apparent to one skilled in the art upon consideration of the written specification, appended claims, and attached drawings.

BRIEF DESIGNATION OF THE DRAWINGS

Figure 2:
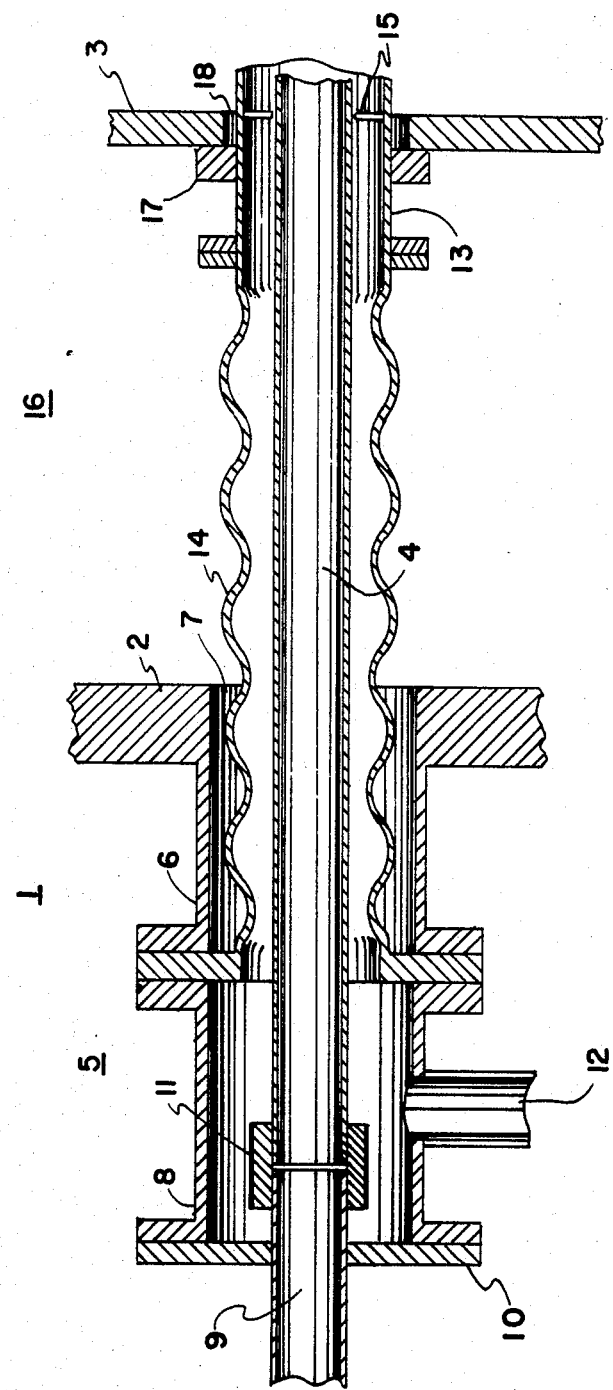

FIG. 1 is a sectioned elevation of a double-walled gasifier vessel in which the present invention is embodied; and FIG. 2 is a sectioned elevation of part of FIG. 1.

BEST MODE FOR CARRYING OUT THE INVENTION

FIG. 1 discloses a double-walled gasifier vessel 1 comprising a vertically suspended outer pressure vessel 2 and a vertically suspended inner reaction vessel 3. Air-entrained solid fuel, usually coal, and secondary air are supplied reaction vessel 3 through conduits or pipes which must penetrate the walls of the outer containment vessel 2 and inner reaction vessel 3. The present invention provides a structure which compensates for the differential expansion and contraction of the two vessels during transient conditions, such as start-up, shut-down, and load changes.

FIG. 2 provides a sectioned closeup view of the structure embodying the invention. The primary air/fuel conduit 4 provides the straight, direct travel of the air-entrained fuel into reaction vessel 3 from its penetration of the pressure boundary. Pressure boundary containment vessel 2 is provided an extension 5 in order to extend the pressure boundary to the entrance of conduit 4.

The first part of extension 5 is a flanged cylinder 6 which is welded over an aperture 7 in the wall of pressure boundary vessel 2. This flanged cylinder providing access to the vessel interior may be referred to as a "nipple". A spool 8 is flanged to the nipple. Air/fuel pipe 4 connects to the source of primary air and fuel, represented by conduit 9. Conduit 9 penetrates a blind flange 10 on the outer end of spool 8. Mounted to and welded thereto, conduit 9 penetrates the blind flange 10 and represents the source of air-entrained solid fuel. Of course, the solid fuel is supplied conduit 9 but is not shown. A flexible coupling 11 connects the penetrating end of conduit 9 to the outer end of the primary air/fuel conduit 4. Primary air fuel conduit 4 is thereby provided a degree of flexure which will compensate for the differential thermal expansion between vessels 2,3. Secondary air is provided through an opening 12 into spool 8 and flows through a secondary air conduit 13 into inner vessel 3. A portion of conduit 13 is corrugated at 14 to function as an expansion joint to compensate for the relative movement between the two vessels. Primary air/fuel conduit 4 rests on supports 15 (i.e., is not fixed) at the waterwall, so that the small relative angle between the primary and secondary conduits (nozzles) during movement can be easily accommodated. Inner vessel 3 is sealed from annular region 16 between the two vessels by a seal box 17 which is seal-welded to both the inner vessel 3 and the secondary air conduit 13, and over an elongated opening 18 in the wall of inner vessel 3. Because of the flexibility of the coupling 11 and expansion joint 14 of secondary air conduit 13, stresses at seal box 17 are eliminated or at least minimized.

CONCLUSION

Gasifier 1 provides the means with which to convert solid fuel into usable gas. The precise conditions for gas generation within inner vessel 3 need no disclosure. The gas generating condition maintained in vessel 3 results in a gas production which flows upward through conduit 20. Equipment downstream of the gasifier removes particulates and corrosive sulfur compounds as required for use. Of course, there is no need for disclosing the downstream conditioning apparatus or equipment using the cleaned gas.

Although the specific structure for supporting the gasifier 1 in its vertical orientation is not required for the disclosure of the invention, both the pressure boundary vessel 2 and the inner reaction vessel 3 are suspended vertically. Essentially, the two vessels have a common vertical axis. It is the differential downward elongation of the vessels which requires the present invention. It only need be pointed out that annular space 16 must be sealed against leakage of the hot, sulfur compound contaminated gaseous products of inner reaction vessel 3. Slag, or other solid ash residue must be drained from the reaction vessel 3, in an arrangement which prevents leakage of the gaseous products into the annular space 16.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A double-wall vessel for containing a high temperature, elevated pressure chemical reaction, comprising:
    a pressure-resistant outer vessel;
    an inner vessel for containing said reaction, the wall of the inner vessel being cooled by a flow of liquid coolant, the inner vessel wall and the outer vessel wall further defining an annular region therebetween;
    means for conveying a flow stream of gas-entrained solid fuel into the outer vessel through the wall thereof;
    a fuel conduit disposed within the outer vessel for accepting the flow stream entering the outer vessel and conducting the flow stream across the annular region into the inner vessel through an aperture in the inner vessel wall;
    a flexible coupling disposed at the outer end of the fuel conduit proximate the wall of the outer vessel; and
    a secondary air conduit, disposed around the fuel conduit, for conducting a flow stream of secondary air into the inner vessel, the secondary air conduit including an expansion joint between the inner and outer vessels.

2. A solid fuel gasifier comprising:
    a pressure resistant outer vessel;
    a water-cooled inner vessel, suspended within the outer vessel, the inner and outer vessels defining an annular region therebetween;
    s nipple, secured to the wall of the outer vessel and defining anopening in the wall thereof;
    a hollow spool, secured to the nipple at one end extending outward from the wall of the outer vessel;

means for conveying a flow stream of gas-entrained solid fuel into the spool through a blind flange secured to the outer end of the spool;

a solid fuel conduit, extending from within the spool, through the nipple and annular region, and into the inner vessel, for conducting the flow stream into the inner vessel;

a flexible connector, disposed within the spool between the conveying means and the conduit; and a support for the inner end of the conduit at the wall of the inner vessel.

3. The gasifier as recited in claim 2, including an aperture in the wall of the spool for admitting a flow stream of secondary gas, and an expansion joint surrounding the fuel conduit and extending from the spool to the inner vessel for conducting the flowing secondary gas into the inner vessel.

4. The gasifier as recited in claim 3, wherein an aperture is defined in the wall of the inner vessel, and further comprising:

a seal box mounted to the inner vessel within the annular region and sealed to the inner wall about the aperture and to the expansion joint, to isolate the annular region from the interior of the inner vessel.

* * * * *